Oct. 11, 1960 R. D. FENITY ET AL 2,955,942
THAW INDICATOR
Filed July 18, 1957
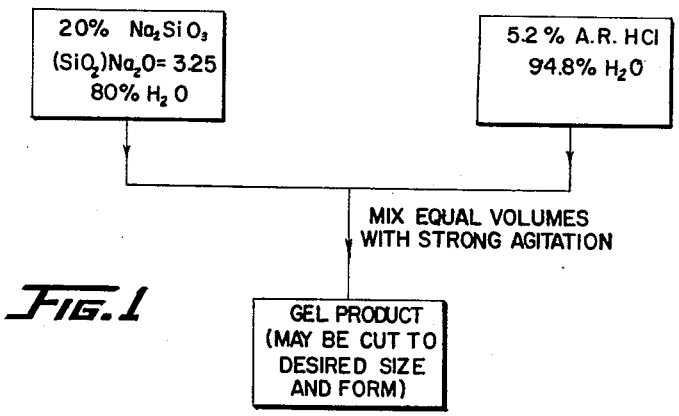
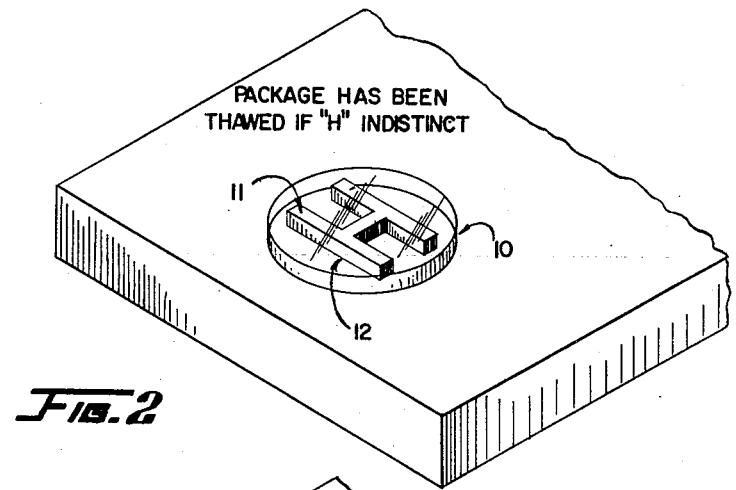
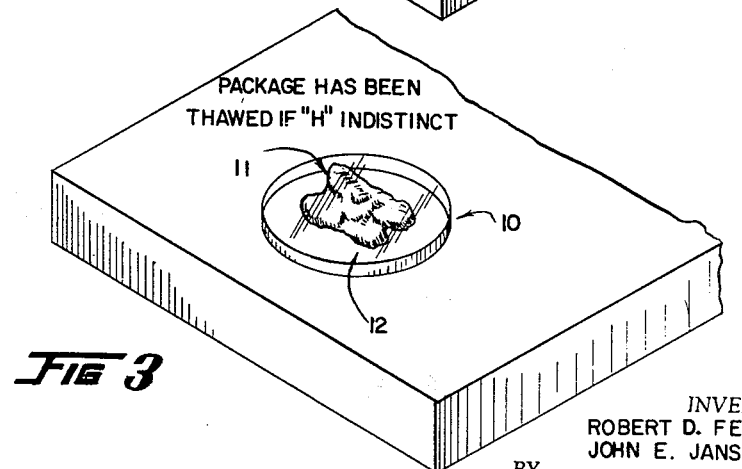
INVENTOR.
ROBERT D. FENITY
JOHN E. JANSSEN
BY
ATTORNEY

United States Patent Office 2,955,942
Patented Oct. 11, 1960

2,955,942
THAW INDICATOR

Robert D. Fenity, Minnetonka Village, and John E. Janssen, St. Louis Park, Minn., assignors to Minneapolis-Honeywell Regulator Company, Minneapolis, Minn., a corporation of Delaware Filed July 18, 1957, Ser. No. 672,811

4 Claims. (Cl. 99—192)

The present invention relates generally to a condition responsive device arranged to indicate when a certain upper or lower temperature limit has been reached or exceeded, and more particularly to such an apparatus which is arranged to irreversibly visually indicate when the contents of a frozen food package has exceeded a certain temperature limit, this limit generally falling at 32° F. or below. Apparatus of this sort are designed to indicate whether or not the contents of a frozen food package have been warmed to a certain temperature for a sufficient length of time to cause deterioration to an undesirable or dangerous point of spoilage. Inasmuch as the spoilage of frozen food is generally quite rapid at temperatures at or near 32° F. and above, it is normally quite desirable to have a reliable condition responsive device physically associated with the frozen food package and arranged to indicate any unfavorable temperature exposure history. Since the device is irreversible in its indication, any refreezing of the contents will not cause the indicator to revert to its previous condition.

In the past, it has been proposed to make devices for this purpose by various means. Among these include the preparation of a chemical indicator positioned at one extreme on an absorbent material such as a blotter or the like, while at the other end there is placed a treated material which is arranged to traverse the length of the absorbent material and the treatment being such as to cause a change in color in the indicator upon thawing of the treated material. Among other schemes are the use of fugitive figures which are destroyed upon melting, enzyme-indicator combinations which are arranged to change color upon exposure to certain time-temperature conditions. With virtually all of the prior art devices of this sort, it has been necessary to manufacture and store the indicators under special environment, such as at a low temperature, prior to use, these indicators requiring substantially the same refrigeration as the frozen food upon packaging. It is readily apparent that such a practice carries with it certain disadvantages in manufacture, storage, packing, and the like, and consequently are economically unsound.

According to the present invention, a frangible matrix body is provided with a certain amount of interstitial liquid which has a physical characteristic of expansion upon freezing. In this connection, a silica gel body may be prepared, the gel body including a certain amount of interstitial water. This body is then encapsulated in a suitable enclosure or envelope to prevent dessication and provide physical protection and may be stored at ordinary room conditions until needed. The device is triggered when initially frozen, that is the gel structure appears to be ruptured by the expansion of the interstitial liquid, in this case water, the freezing of the water assisting the gel in retaining its shape or configuration until thawed. Upon thawing, the structure having previously been disassociated irreversibly disintegrates into a shapeless mass such as a ball of gelatinous fluid or the like.

Devices of this sort are extremely inexpensive to fabricate, are non-toxic in nature, and may be treated with certain salt solutions or the like to have certain selected melting or disintegrating temperatures. When encapsulated in a polyethylene container, envelope or the like, the devices do not have to be maintained in any particular or unusual atmospheric condition prior to packaging.

It is therefore an object of the present invention to provide an irreversible visual indicating apparatus for frozen food packages or the like, the apparatus not requiring storage at or under any particular atmospheric condition prior to use.

It is a further object of the present invention to provide a silica gel freeze-thaw indicator which is inexpensive to fabricate, harmless and non-toxic in nature, the melting temperature of the gel body being pre-selected.

Other and further objects of the present invention will become apparent upon a study of the following specification, appended claims, and accompanying drawings, wherein:

Figure 1 is a flow sheet of a preferred process for preparing devices for use in accordance with the present invention;

Figure 2 is a partial perspective view of a frozen food package including an encapsulated device prepared in accordance with the present invention; and Figure 3 is a view similar to Figure 2 showing the device of the present invention in thawed condition.

According to the preferred modification of the present invention the freeze-thaw indicator is prepared from a solution of alkaline silicate such as sodium silicate, or an alkaline earth silicate, together with a mineral acid such as HCl, $H_2SO_4$, $HNO_3$ or the like. The gels are made by the addition of the mineral acid to the silicate solution, such as for example, the addition of HCl to a solution of sodium silicate until a pH of about 8 or lower is attained. In this connection, it is desirable for operation to entrain a quantity of water in the gel structure per se in order that the gel body may be ruptured or destroyed upon the expansion of the entrained water upon initial freezing thereof. The structure having been so ruptured or destroyed upon freezing completely fails upon subsequent thawing.

Specific methods of preparation are given in the following examples:

Example 1

Reference is made to the flow sheet designated Figure 1 of the accompanying drawing which is a schematic description of this particular example. Solution A consists of 20% by volume commercial sodium silicate solution ($SiO_2/Na_2O$=3.25; density 40–42° Bé.) and 80% by volume water. Solution B consists of 5.2% by volume A.R. HCl solution and 94.8% water. Mix equal volumes of A and B with strong agitation during mixing, the acid being added to the silicate. Gel time is about 1 to 2 minutes, occurring subsequent to agitation and mixing. This composition calculates to about 5.2% by weight sodium silicate, 1.5% by weight HCl and 93.3% by weight $H_2O$. This procedure is preferred since a more thorough mixture can be obtained in this manner and it is more adaptable to subsequent forming of products, if desired. Further delay in gel time can be obtained by diluting this composition. It should be pointed out that although this is merely the base composition, various additives might be used to modify the color, freezing and thawing characteristics, gel strength etc. As an example of these, methyl red may be employed as a coloring agent, this material not disrupting the thaw breakdown. Alcohol, glycol or salts are examples of materials which can be added to modify the temperatures of freezing and thawing.

Example 2

To 100 cc. of commercial silicate solution $$\left(\frac{SiO_2}{Na_2O}=3.25\right)$$

containing 62% $H_2O$ there is added 400 cc. of $H_2O$ and 26 cc. A.R. HCl, the additions being made with rapid stirring. Gelation occurs almost instantaneously. The components of this gel calculate as 10.1% by weight $Na_2O$—3.25 $SiO_2$ solids, 1.8% HCl, and 88.1% $H_2O$, the solution having a pH of about 7.

In general, the concentration of sodium silicate solids in the solution for the various gels ranges from about 1% up to about 10%. For these purposes, ordinary sodium silicates having a ratio of $$\frac{SiO_2}{Na_2O}$$

ranging from about 1 to about 4 are satisfactory as raw materials.

Inasmuch as the gel material on thawing after being initially triggered assumes a more or less spherical, droplike or other shapeless type form, it is generally desirable to cut a form to be used in such a maner that the indicator has a normal form other than spherical or the like. For example, an H-form may be cut from the gel with a simple die, and a column of gel so formed may be cut into relatively thin bodies or wafers having an H cross section. In this manner it is impossible that the indicator having a length dimension which substantially exceeds the transverse dimension will resume the initial form after having been triggered and subsequently thawed. Of course, the gel may be shaped in many other suitable manners by various methods such as by cutting, casting, extrusion or the like.

In order that the units may be relatively easily and conveniently stored prior to freezing, it is preferred that the gel body be encapsulated in a suitable envelope. More specifically, the envelope should be sealed from the atmosphere by providing a hermetic or vapor tight seal between the gel body and the ambient atmosphere to enable storage under any room conditions. The gel structure will then not risk the possibility of becoming desiccated, more highly saturated, or otherwise harmed prior to use. Of course, if desired, the gel bodies may be cut immediately prior to use and frozen within the storage package.

Reference is made to the devices described in Figures 2 and 3. In this connection, the freeze-thaw indicator 10 includes a gel body 11 sealed within a polyethylene container 12. The edges of the container are sealed by conventional heat sealing methods which are well known in the art today. As illustrated this indicator may be conveniently placed within the frozen food package in good thermal contact with the contents and exposed to view for the consumer. Upon initial freezing of the package, the indicator is triggered, the gel structure being ruptured but remaining intact, (see Figure 2) and upon thawing the H-cross section assumes the form of a shapeless mass (see Figure 3). The consumer will then be aware of the storage history of the packaged product, this history being either satisfactory or unsatisfactory.

Of course, other embodiments may be made of the present invention without departing from the specific structure of the present invention. It will be understood, therefore, that the specific embodiments given are only intended to be illustrative and we are to be limited only by the scope of the appended claims.

We claim:

1. The method of arranging for an indication of exposure of the contents of a frozen food package to thawed conditions which method comprises placing an encapsulated frangible silica gel matrix body having interstitial water retained therein into close proximity with the said contents, and subsequently freezing said frangible silica gel matrix body, thereby substantially destroying the gel structure thereof.

2. The method of arranging for an indication of exposure of the contents of a frozen food package to thawed conditions which method comprises placing an encapsulated frangible silica gel matrix body having interstitial water retained therein and having a mass which is small relative to the mass of the said contents, into close proximity with the said contents, and subsequently freezing said frangible silica gel matrix body, thereby substantially destroying the gel structure thereof.

3. The method of arranging for an indication of exposure of the contents of a frozen food package to thawed conditions which method comprises placing an encapsulated frangible silica gel matrix body having a water content ranging from between about 10% up to about 99% into close proximity with the said contents, and subsequently freezing said frangible silica gel matrix body, thereby substantially destroying the gel structure thereof.

4. The method of arranging for an indication of exposure of the contents of a frozen food package to thawed conditions which method comprises placing an encapsulated frangible silica gel matrix body having a distinct physical form and having interstitial water retained therein into close proximity with the said contents, and subsequently freezing said frangible silica gel matrix body, thereby substantially destroying the gel structure thereof.

References Cited in the file of this patent

UNITED STATES PATENTS

| | | |
|---|---|---|
| 2,574,763 | Sears | Nov. 13, 1951 |
| 2,662,018 | Smith | Dec 8, 1953 |